United States Patent
Schaeuble (10) Patent No.: US 9,796,360 B2
(45) Date of Patent: Oct. 24, 2017

(54) WIPER DEVICE AND WIPER ARM FOR CLEANING A VEHICLE WINDOW

(71) Applicant: Valeo Systèmes d'Essuyage, Le Mesnil Saint Denis (FR)

(72) Inventor: Michael Schaeuble, Vaihingen/enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 342 days.

(21) Appl. No.: 14/419,073

(22) PCT Filed: Aug. 5, 2013

(86) PCT No.: PCT/EP2013/066420
§ 371 (c)(1),
(2) Date: Feb. 2, 2015

(87) PCT Pub. No.: WO2014/023702
PCT Pub. Date: Feb. 13, 2014

(65) Prior Publication Data
US 2015/0191154 A1     Jul. 9, 2015

(30) Foreign Application Priority Data
Aug. 7, 2012   (DE) .................. 10 2012 107 231

(51) Int. Cl.
*B60S 1/34*   (2006.01)
*B60S 1/38*   (2006.01)
*B60S 1/52*   (2006.01)

(52) U.S. Cl.
CPC ........... *B60S 1/3415* (2013.01); *B60S 1/3436* (2013.01); *B60S 1/3454* (2013.01); *B60S 1/522* (2013.01);
(Continued)

(58) Field of Classification Search
CPC .. B60S 1/48; B60S 1/522; B60S 1/524; B60S 1/3459; B60S 1/345; B60S 1/3415;
(Continued)

(56) References Cited

U.S. PATENT DOCUMENTS 2,336,007 A * 12/1943 Fuller ................... B60S 1/3415
15/250.04
2,549,027 A *  4/1951 Smulski ................ B60S 1/3415
15/250.04
(Continued)

FOREIGN PATENT DOCUMENTS

EP      0 317 856 A2    5/1989
EP      1 088 719 A2    4/2001
(Continued)

OTHER PUBLICATIONS

International Search Report for corresponding International Application No. PCT/EP2013/066420, dated Nov. 19, 2013 (2 pages).
(Continued)

*Primary Examiner* — Gary Graham
(74) *Attorney, Agent, or Firm* — Osha Liang LLP (57) ABSTRACT

A wiper device for cleaning a vehicle window is disclosed. The wiper device has a wiper arm fastened in a torque-proof manner to a wiper shaft via an articulation piece, the wiper arm being arranged pivotably on the articulation piece in a pivot axis, a wiper blade arranged on the wiper arm, and a washing device for the wiper blade, which contains a feed for a washing fluid, wherein the feed runs in the longitudinal axis of the wiper shaft and leads to the wiper blade in a direction running substantially perpendicularly to the longitudinal axis.

10 Claims, 6 Drawing Sheets

(52) U.S. Cl.
CPC ............ *B60S 1/524* (2013.01); *B60S 1/3413* (2013.01); *B60S 1/3459* (2013.01); *B60S 2001/3825* (2013.01)

(58) Field of Classification Search
CPC .... B60S 1/3436; B60S 1/3443; B60S 1/3454; B60S 2001/3825
USPC ........... 15/250.04, 250.351, 250.352, 250.34
See application file for complete search history.

(56) References Cited

U.S. PATENT DOCUMENTS

| | | | |
|---|---|---|---|
| 3,670,354 A | | 6/1972 | Weber |
| 3,887,956 A | * | 6/1975 | Wind ..................... B60S 1/522 |
| | | | 15/250.04 |
| 5,327,614 A | * | 7/1994 | Egner-Walter ........ B60S 1/3415 |
| | | | 15/250.04 |
| 5,349,719 A | * | 9/1994 | Egner-Walter ............ B60S 1/34 |
| | | | 15/250.04 |
| 5,454,134 A | * | 10/1995 | Edele ................... B60S 1/3415 |
| | | | 15/250.04 |

FOREIGN PATENT DOCUMENTS

| | | |
|---|---|---|
| FR | 1 295 138 | 4/1962 |
| FR | 2 735 735 A1 | 12/1996 |
| WO | 90/10561 A1 | 9/1990 |

OTHER PUBLICATIONS

Search Report for corresponding German Application No. 10 2012 107 231.0, dated Apr. 8, 2013 (2 pages).

* cited by examiner

WIPER DEVICE AND WIPER ARM FOR CLEANING A VEHICLE WINDOW

PRIOR ART

The invention relates to a wiper device for cleaning a vehicle window. The wiper device has a wiper arm fastened in a torque-proof manner to a wiper shaft via an articulation piece, wherein the wiper arm is arranged pivotably on the articulation piece in a pivot axis; a wiper blade arranged on the wiper arm; and a washing device for the wiper blade, which contains a feed for a washing fluid, wherein the feed runs in the longitudinal axis of the wiper shaft and leads to the wiper blade in a direction running substantially perpendicularly to the longitudinal axis. The invention also relates to a wiper arm for use in a wiper device according to the invention.

A wiper device of this kind is already known from the prior art and is used to route a washing fluid out of the region of a wiper shaft in the direction of a wiper blade, with the result that, when the wiper blade moves, the washing fluid can be applied to the vehicle window immediately in front of the wiper blade. To this end, known wiper devices have a feed tube, which is arranged in the longitudinal axis of the wiper shaft, for the washing fluid, said feed tube being connected to a washing fluid hose on that side which faces the wiper arm, said washing fluid hose in turn being used to supply washing fluid to washing fluid ducts which are arranged on the wiper blade body. Since the washing fluid hose is elastic, it is possible to pivot the wiper arm in the region of the wiper shaft, in order to, for example, replace the wiper blade without the washing fluid hose having to be removed from the feed tube or the wiper blade body. Although hose connections for feeding washing fluids have proven effective in practice, the problem of the risk of bending or damage and ageing of the material is, in principle, encountered in hoses of this kind. Furthermore, it is necessary to structurally provide a corresponding space for the washing fluid hose by corresponding measures so that said washing fluid hose can deform in a corresponding manner when the wiper arm is pivoted on the wiper shaft.

DISCLOSURE OF THE INVENTION

Proceeding from the presented prior art, the object of the invention is to develop a wiper device for cleaning a vehicle window where the wiper device has a wiper arm fastened in a torque-proof manner to a wiper shaft via an articulation piece, wherein the wiper arm is arranged pivotably on the articulation piece in a pivot axis; a wiper blade arranged on the wiper arm; and a washing device for the wiper blade, which contains a feed for a washing fluid, wherein the feed runs in the longitudinal axis of the wiper shaft and leads to the wiper blade in a direction running substantially perpendicularly to the longitudinal axis in such a way that an alternative design for feeding a washing fluid from the region of a wiper shaft to a wiper blade body or to the wiper blade is specified, it being possible for the use of washing fluid hoses to be dispensed with, without the ability of the wiper arm to pivot on the wiper shaft being reduced or restricted as a result.

According to the invention, this object is achieved with a wiper device for cleaning a vehicle window having a wiper arm fastened in a torque-proof manner to a wiper shaft via an articulation piece, wherein the wiper arm is arranged pivotably on the articulation piece in a pivot axis; a wiper blade arranged on the wiper arm; and a washing device for the wiper blade, which contains a feed for a washing fluid, wherein the feed runs in the longitudinal axis of the wiper shaft and leads to the wiper blade in a direction running substantially perpendicularly to the longitudinal axis in that the feed comprises an outlet connecting piece arranged on the articulation piece or on the wiper arm, oriented parallel to the longitudinal axis of the wiper shaft, in that the outlet connecting piece in the operating position of the wiper blade engages in a mount constructed on the wiper arm or on the articulation piece, and in that the wiper arm is pivotably arranged in the articulation piece perpendicularly to the longitudinal axis of the wiper shaft at least between two positions, a first position, in which the outlet connecting piece engages into the mount, and a second position, in which the outlet connecting piece is out of engagement with the mount. In other words, this means that the hydraulic connection between the region of the wiper shaft and the wiper blade is made by means of an outlet connecting piece and a mount or an inlet connecting piece which establish a hydraulic connection in the operating position, and that the wiper arm is pivotably arranged in relation to the wiper shaft in such a way that a second position, in which the outlet connecting piece is out of engagement with the mount, is possible. This second position can be used, in particular, for servicing and assembly purposes, or else for replacing the wiper blade or the wiper arm.

Advantageous developments of the wiper device according to the invention for cleaning a vehicle window include:

(i) the mount is constructed together with the washing fluid ducts in a wiper arm carrier element of the wiper arm, and the wiper arm carrier element is constructed at least partially as an injection moulded part, (ii) the pivoting angle between the articulation piece and the wiper arm is delimited by stop elements, (iii) a sealing element in the form of an O-ring is arranged between the outlet connecting piece and the mount, (iv) the region between the articulation element and the wiper arm in the region of the mount is arranged by a sealing element in the form of a sealing washer, (v) the wiper arm is arrested in the first position by means of a detent connection, and that the detent connection has at least one manually actuatable element for clearing the detent connection, (vi) the wiper arm is acted upon by force in the direction of the second position by means of a spring element formed in one piece on the wiper arm or on the articulation piece, (vii) the wiper arm is fixed on the wiper shaft by a clamping connection having a clamping screw, and that the wiper shaft has a toothing region for fixing the wiper arm in various longitudinal positions of the wiper arm on the wiper shaft, (viii) the clamping screw is overlapped by the wiper arm in the first position of the wiper arm, and is freely accessible in the second position.

All combinations of at least two features disclosed in the claims, the description and/or the figures are covered by the scope of the invention.

A refinement of the invention which is preferred in respect of manufacturing makes provision for the mount to be constructed together with washing fluid ducts in a wiper arm carrier element of the wiper arm, and for the wiper arm carrier element to be constructed at least partially as an injection moulded part. A construction of this kind also has the advantage that no separate elements which route the washing fluid out of the region of the mount in the direction toward the washing fluid ducts are necessary, with the result that expenditure on assembly is also particularly low.

In order to clearly indicate to the operator that he has reached a service position, in which he can, for example, replace the wiper blade, when pivoting the wiper arm, provision is further made for the pivoting angle between the articulation piece and the wiper arm to be delimited by stop elements. Stop elements of this kind also have the advantage that incorrect operation and mechanical overloading of the parts is avoided in the event of the wiper arm being accidentally excessively pivoted.

In order to prevent washing fluid emerging from the connection region between the outlet connecting piece and the mount, provision is made in a first structural refinement for an O-ring to be arranged between the outlet connecting piece and the mount.

However, in an alternative structural refinement to an O-ring, provision can also be made for the region between the articulation element and the wiper arm in the region of the mount to be sealed off by a sealing washer.

In order to prevent the wiper arm moving from its operating position, in which a continuous hydraulic connection for the washing fluid is formed, to a service position, without this being intended by an operator, provision can also be made for the wiper arm to be arrested in the first position by means of a detent connection, and for the detent connection to have at least one manually actuatable element for clearing the detent connection.

In order to design the connection between the articulation piece and the wiper arm to be free of play, provision is also made for the wiper arm to be acted upon by force in the direction of the second position by means of a spring element formed in one piece on the wiper arm or on the articulation piece.

Particularly simple fastening of the wiper to the wiper shaft, it being possible to easily adapt said fastening operation to the respective conditions, is achieved when the wiper arm is fixed on the wiper shaft by means of a clamping connection having a clamping screw, and when the wiper shaft has a longitudinal toothing region for fixing the wiper arm in various longitudinal positions of the wiper arm on the wiper shaft.

A clamping screw which is arranged in an unprotected manner is exposed to environmental influences over the service life of the wiper device, said environmental influences, for example, making it difficult to remove the wiper arm from the wiper shaft when, for example, rust has formed. For this reason, provision is made in a further refinement of the invention for the clamping screw to be overlapped by the wiper arm in the first position of the wiper arm, and to be freely accessible in the second position.

The invention also comprises a wiper arm for use in a wiper device according to the invention.

Further advantages, features and details of the invention can be found in the following description of preferred exemplary embodiments and with reference to the drawing, in which.

Identical elements or elements with the same function are provided with the same reference numerals in the figures.

Figure 1:
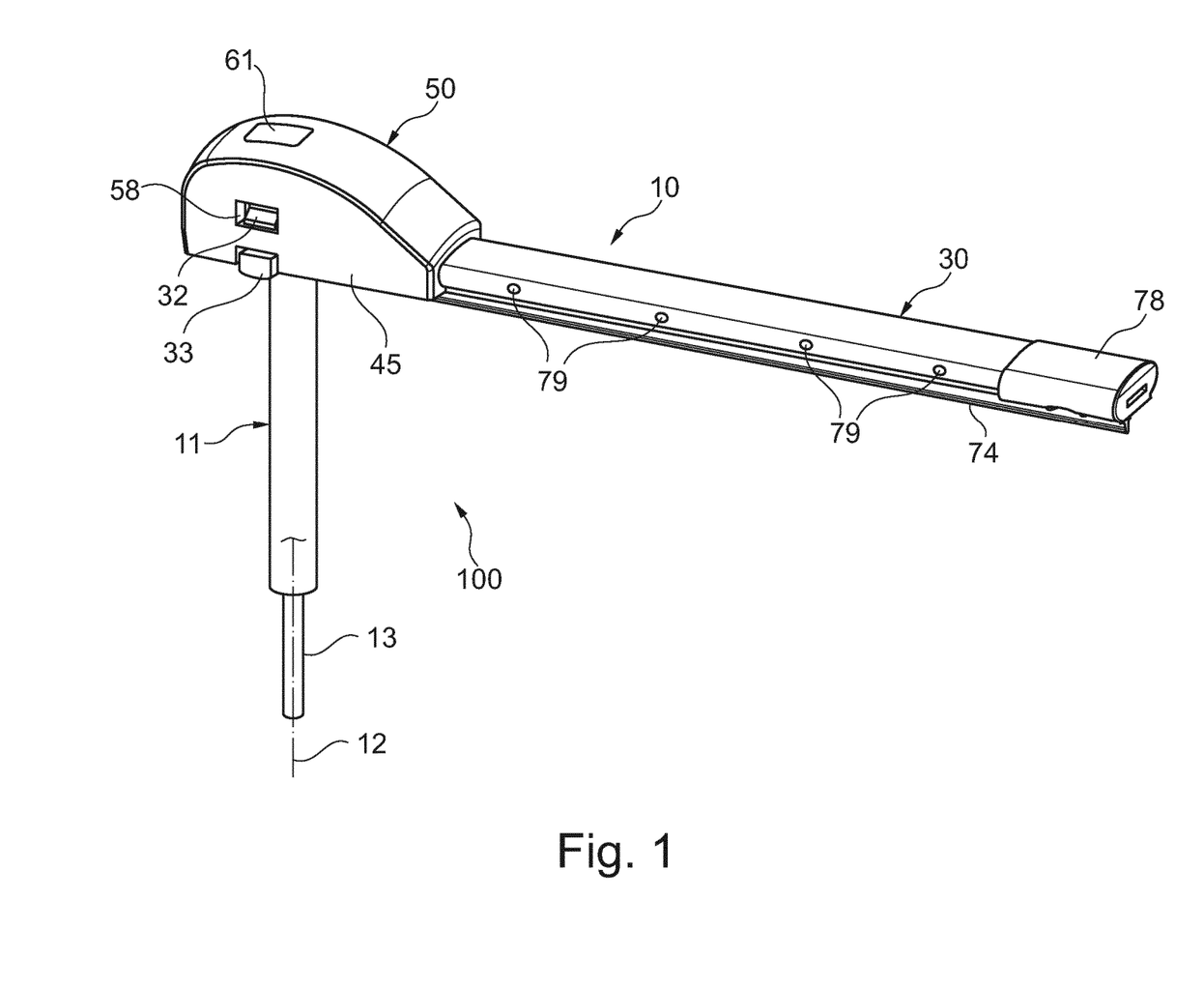
FIG. 1 shows a perspective view of a wiper device according to the invention in the operating position.

FIG. 1 shows a wiper device 100 according to the invention for cleaning a vehicle window (not illustrated), in particular a vehicle window in the rear region of a motor vehicle. The wiper device 100 comprises a wiper arm 10 which is fastened in a torque-proof manner to one end of a wiper shaft 11. The wiper shaft 11 is constructed as a hollow shaft and has a feed tube 13, which is arranged in the longitudinal axis 12 of the wiper shaft 11, for a washing fluid. The feed tube 13 is, for its part, connected to a storage container for the washing fluid.

Figure 2:
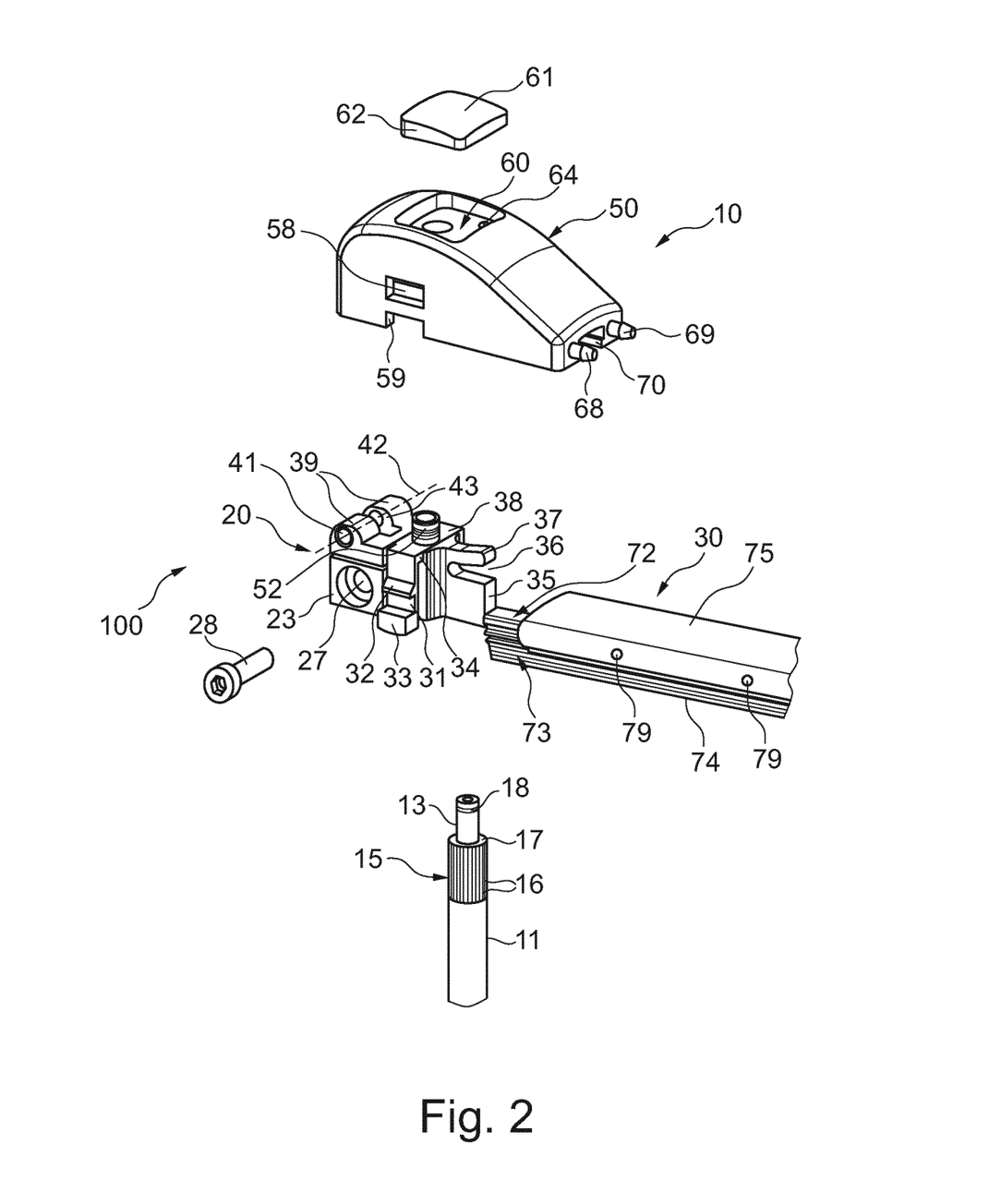
FIG. 2 shows an exploded illustration of constituent parts of the wiper device according to FIG. 1.

As can be seen, in particular, with reference to FIG. 2, that end of the wiper shaft 11 which faces the wiper arm 10 has a toothing region 15 with a large number of teeth 16 which are arranged in the longitudinal direction of the wiper shaft 11. The wiper arm 10 is connected to the wiper shaft 11 in the toothing region 15, it being possible, on account of the construction of the toothing region 15, to fasten the wiper arm 10 on the wiper shaft 11 in different vertical or longitudinal positions. The end of the feed tube 13 projects out of the upper end face 17 of the wiper shaft 11. In that section which projects out of the wiper shaft 11, the feed tube 13 has a radially circumferential annular groove in which a sealing element in the form of an O-ring 18 is arranged.

Figure 7:
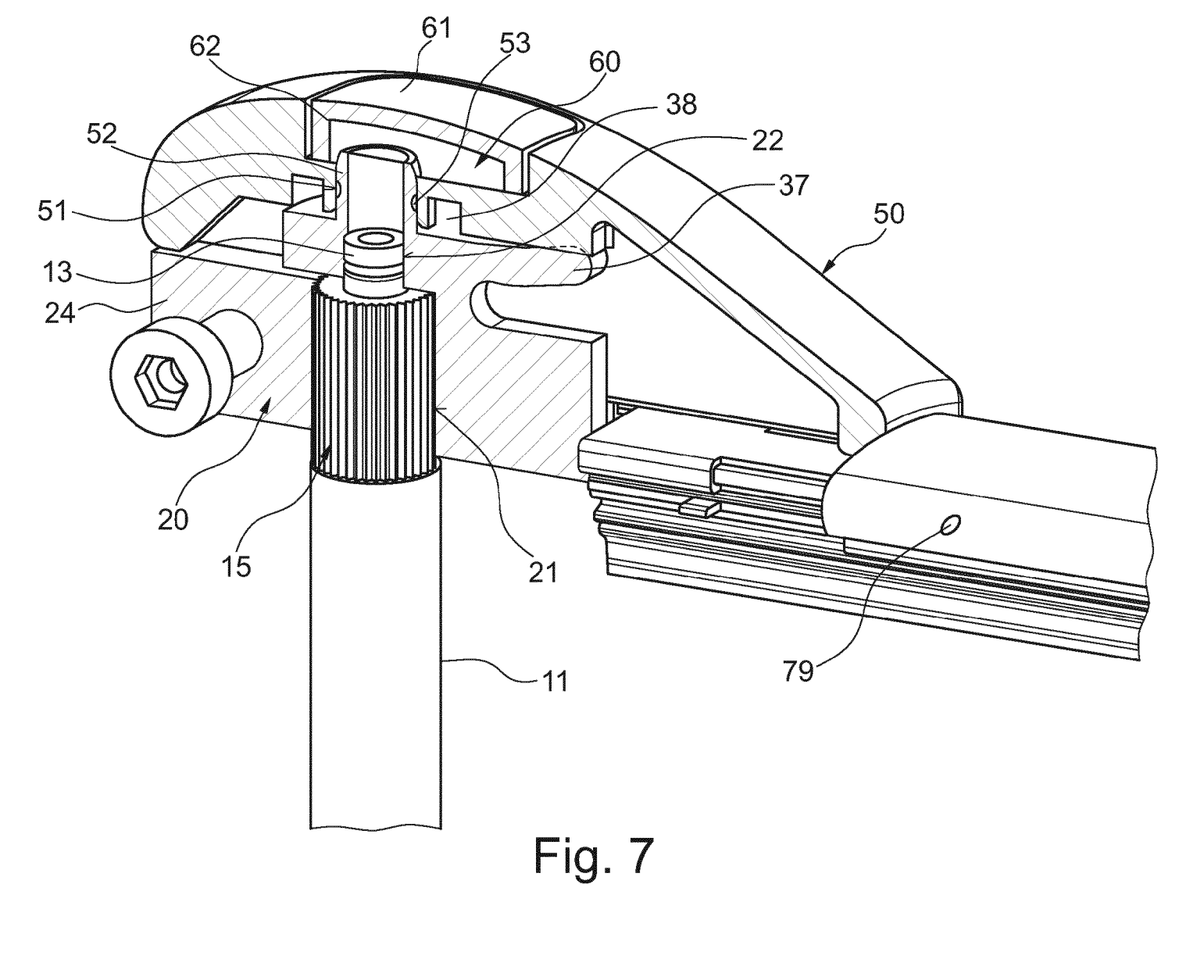
FIG. 7 shows a partially sectioned illustration of the wiper device in the connection region between an articulation piece and the wiper arm.

The wiper arm 10 is fastened to the wiper shaft 11 by means of an articulation piece 20 which is composed of plastic and is constructed as an injection moulded part. The articulation piece 20 has a receiving bore 21, which can be seen in FIG. 7, for the toothing region 15. On that side which is averted from the wiper shaft 11 or the feed tube 13, the receiving bore 21 tapers into a receiving section 22 in which that region of the feed tube 13 which projects out of the wiper shaft 11 is at least partially accommodated.

Figure 6:
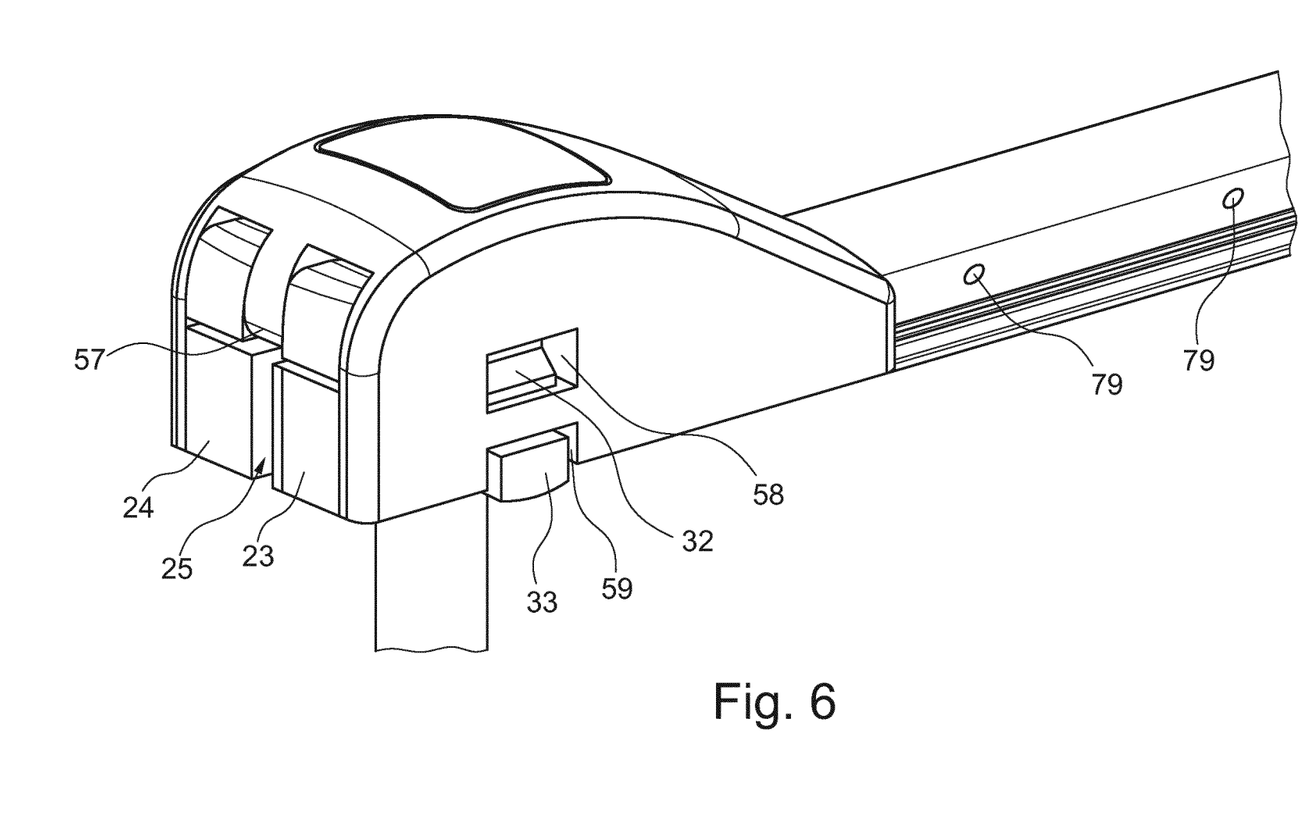
FIG. 6 shows a perspective side view of the wiper device according to FIG. 1.

The articulation piece 20 has two clamping limbs 23, 24 between which a longitudinal slot 25 which extends as far as the receiving bore 21 is constructed (FIG. 6). A receiving bore 27 which serves to receive a clamping screw 28 passes through the two clamping limbs 23, 24 level with the receiving bore 21. The receiving bore 27 runs perpendicularly to the longitudinal axis 12 on that side of the wiper shaft 11 which is averted from the wiper blade 30. The clamping screw 28 forms, together with the receiving bore 27, a clamping connection which allows the articulation piece 20 to be fastened in a torque-proof manner in a desired vertical or longitudinal position on the toothing region 15 of the wiper shaft 11 in a clamping manner in the region of the receiving bore 21 by tightening the clamping screw 28.

In each case one detent tongue 31 with a detent hook 32 and an operating knob 33 is arranged above a connecting section 34 on opposite sides of the articulation piece 20 in alignment with the receiving bore 21. The two detent tongues 31 or the detent hooks 32 can be moved from an arresting position, which is illustrated in FIG. 2, to a release position by pushing the two operating knobs 33 together in the direction of the receiving bore 27. On that side which faces the wiper blade 30, the articulation piece 20 has a central web 35 with a slot 36. On that side of the articulation piece 20 which faces the wiper shaft 11, the articulation piece 20 forms a spring tongue 37, which projects upward to a certain extent, above the slot 36. In particular, the spring tongue 37 projects beyond a planar upper face 38 of the articulation piece 20. On that side of the articulation piece 20 which is situated opposite the spring tongue 37, said articulation piece also has two retaining regions 39 which project beyond the upper face 38 and in which a bore 41 which runs parallel to the receiving bore 27 is constructed, said bore 41 forming a pivot axis 42. A yet further longitudinal slot 43 is further constructed between the two retaining regions 39.

The wiper arm 10 is pivotably arranged on the articulation piece 20 in the pivot axis 42 together with the wiper blade 30. To this end, the wiper arm 10 has a wiper arm carrier element 50 which is composed of plastic and which can be seen, in particular, when looking at FIGS. 1 to 3 and 7 together. The wiper arm carrier element 50 has an inlet opening in the form of a mount 51 which, in accordance with FIG. 7, surrounds an outlet connecting piece 52 which projects out of the upper face 38 of the articulation piece 20. To this end, provision can be made for the outlet connecting piece 52 to have a sealing element in the form of an O-ring 53 in an annularly circumferential annular groove. Instead of O-ring 53, it is also possible, in accordance with the illustration of FIG. 4, to provide a sealing washer 54 as the sealing element, said sealing washer being accommodated in an annular cutout 55 in the wiper arm carrier element 50 and resting on the upper face 38 of the articulation piece 20.

The wiper arm carrier element 50 has a recess 56 on that side which is averted from the wiper blade 30, the two retaining regions 39 being arranged between them. Bearing pins (not illustrated) which are formed in one piece on the wiper arm carrier element 50 are preferably formed in the region of the bore 41 in the retaining regions 39, said bearing pins engaging in the bore 41 and therefore allowing the wiper arm carrier element 50 to pivot about the pivot axis 42 on the articulation piece 20. The wiper arm carrier element 50 also has a web-like stop element 57 which engages in the longitudinal slot 43 between the two retaining regions 39, and which delimits the pivoting angle of the wiper arm carrier element 50 on the articulation piece 20 by the stop element 57 bearing against a corresponding stop face of the articulation piece 20 starting from a certain pivoting angle, for example a pivoting angle of approximately 100° (based on the operating position of the wiper arm 10 which has an associated pivoting angle of 0°). In each case one rectangular cutout 58 for the detent hook 32 of the detent tongue 31 is constructed on the two side faces of the wiper arm carrier element 50, and an approximately rectangular notch 59 is constructed for the operating knob 33.

On the upper face of the wiper arm carrier element 50, the mount 51 issues into a storage chamber 60 which has an approximately rectangular base area. The storage chamber 60 can be closed by a closure cap 61 with a circumferential side wall 62 by the closure cap 61 being connected, in particular by an ultrasonic welding connection, to the wiper arm carrier element 50, the closure cap 61 being used to form a planar, closed upper face on the wiper arm carrier element 50.

Two longitudinal bores 64 which are arranged parallel to the longitudinal axis 12 extend from the storage chamber 60 at lateral edge regions on that side which faces the wiper blade 30, said longitudinal bores, at their base, in turn in each case issuing into feed bores (not illustrated) on that side which is averted from the storage chamber 60, said feed bores leading to in each case one washing fluid outlet connecting piece 68, 69 on that side which faces the wiper blade 30. The wiper arm carrier element 50 has a groove-like mount 70 between the two washing fluid outlet connecting pieces 68, 69. A wiper blade carrier element 72 with a spring rail which serves as reinforcement can be introduced in an interlocking manner into the mount 70, said wiper blade carrier element in turn receiving a wiper rubber 73 in an interlocking manner in a corresponding mount. The wiper rubber 73 has a wiper lip 74 which bears against the vehicle window. A covering element 75 which is constructed in one piece with the wiper blade carrier element 72 or is constructed as a separate element is arranged on the upper face of the wiper blade carrier element 72. The covering element 75 has in each case one washing fluid duct on its two longitudinal sides, the washing fluid outlet connecting piece 68, 69 engaging in said washing fluid duct. The two washing fluid ducts or the wiper blade 30 are/is closed or covered by means of a closure cap 78, which can be seen in FIG. 1, on that side which is averted from the wiper arm carrier element 50. Bores, which cannot be seen in the figures, which issue into nozzle openings 79 on the outer face of the covering element 75 in order to apply the washing fluid to the vehicle window also extend from the two washing fluid channels in the covering element 75.

FIG. 1 shows the operating position of the wiper blade 30 or of the wiper device 100, in which the wiper lip of the wiper rubber 73 bears against the vehicle window. In this position, the detent hooks 32 of the detent tongue 31 engage in the two cutouts 58 in the wiper arm carrier element 50 and form a detent connection which arrest the wiper blade 30 or the wiper arm 10 in its operating position. On account of the spring tongue 37 of the articulation piece 20 projecting beyond the upper face 38, the spring tongue 37 bears with prestress against a corresponding surface of the wiper arm carrier element 50, with the result that the rotation angle play around the pivot axis 42 is minimized or equalized.

In order to pivot the wiper arm 10 from the operating position illustrated in FIG. 1, for example for replacing the wiper blade 30, it is necessary for the operator to move the two detent hooks 32 out of engagement with the cutouts 58 by pressing the two operating knobs 33 together. As soon as this is done, the wiper arm 10 can be pivoted into said service position, where the pivoting angle of the wiper arm 10 on the articulation piece 20 is limited by the central web 35. When the wiper arm 10 is pivoted, the feed tube 13 moves out of engagement with the mount 51 on the wiper arm carrier element 50 by way of its region which projects out of the articulation piece 20 (or the outlet connecting piece 20 in accordance with the illustration of FIG. 7). As a result, the hydraulic connection between the feed tube 13 and the nozzle openings 79, which connection is formed by the feed tube 13, the mount 51, the storage chamber 60, the longitudinal bores 63, 64, the feed bores in the wiper arm carrier element 50 and the washing fluid ducts in the covering element 75, is interrupted.

Figure 8:
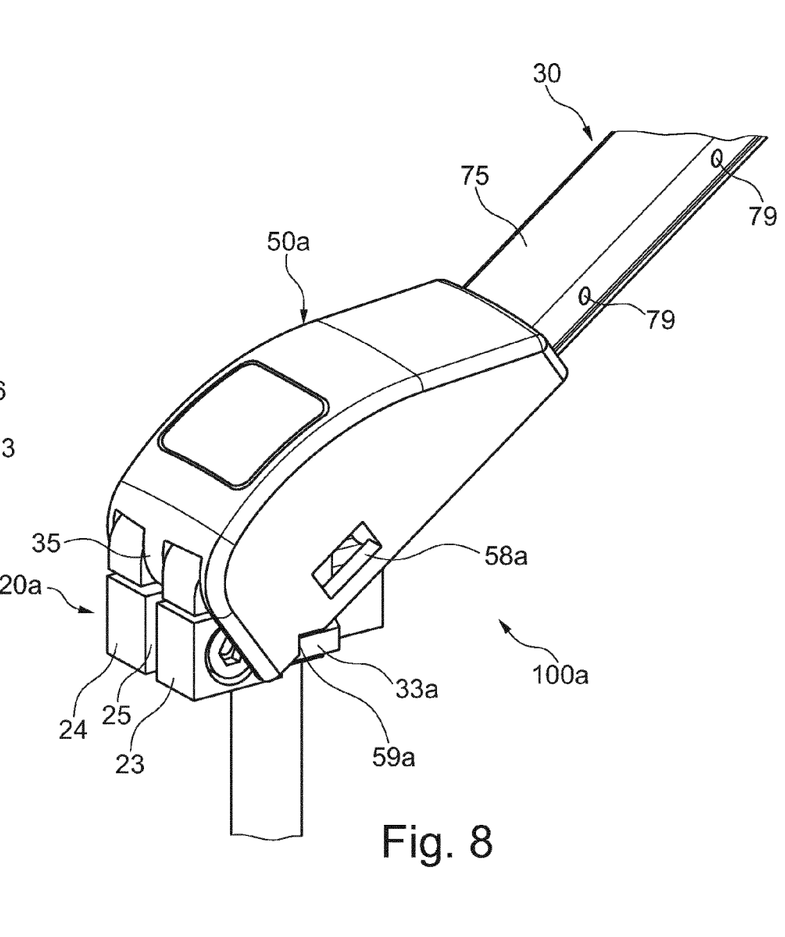
FIG. 8 shows a perspective illustration of a wiper device, which is modified in relation to FIG. 1, in the service position.

FIG. 8 shows a wiper device 100a which is modified in relation to that in FIGS. 1 to 7. In the wiper device 100a, the operating knobs 33a themselves form a detent connection between the articulation piece 20a and the wiper arm carrier element 50a by the operating knobs 33a engaging in the cutout 58a in the operating position (not illustrated) of the wiper blade 30. Furthermore, said figure shows notches 59a on the lower face of the wiper arm carrier element 50a at a lateral distance from the cutouts 58a, said notches being operatively connected to the operating knobs 33a in the service position, which is illustrated in FIG. 8, of the wiper blade 30 or of the wiper arm 10 and preventing the wiper arm 30 from returning in the direction of the operating position. It is also noted that the wiper device 100a, in accordance with the wiper device 100, can likewise have the centre web 35 which delimits the maximum pivoting angle of the wiper arm 10 on the articulation piece 20a.

Figure 3:
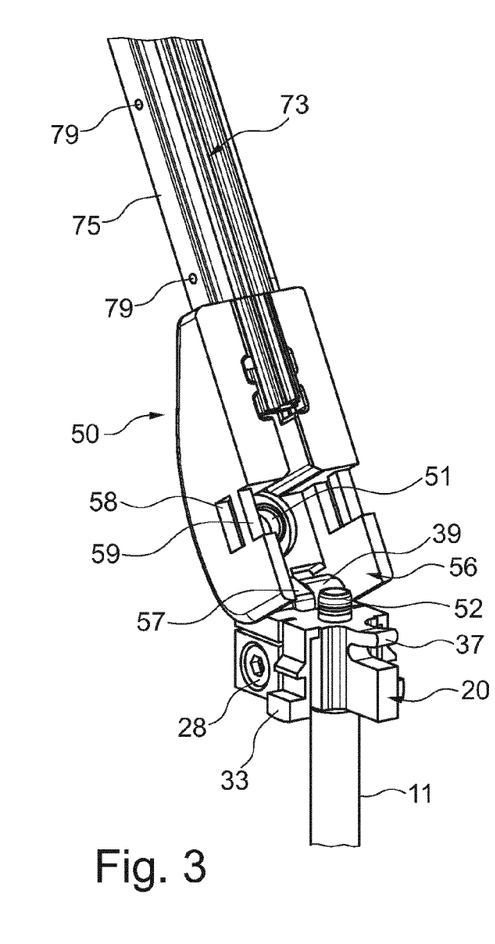
FIG. 3 shows a perspective view of the wiper device according to FIGS. 1 and 2, with the wiper arm pivoted into a service position, FIG. 4 and FIG. 5 each show the connection region between an articulation piece and the wiper arm using different sealing elements.
Figure 4:
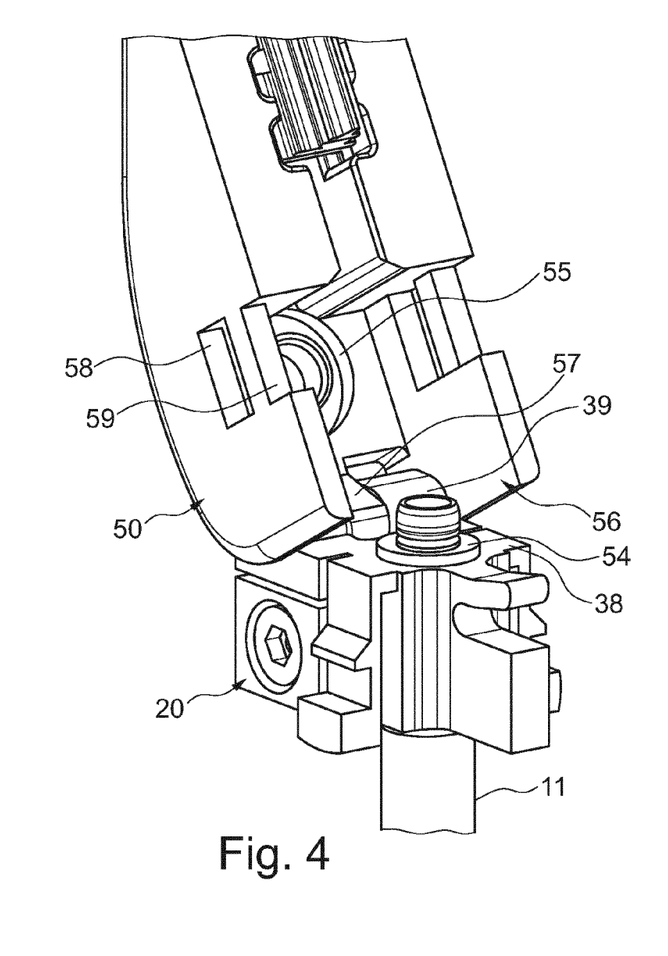
Figure 5:
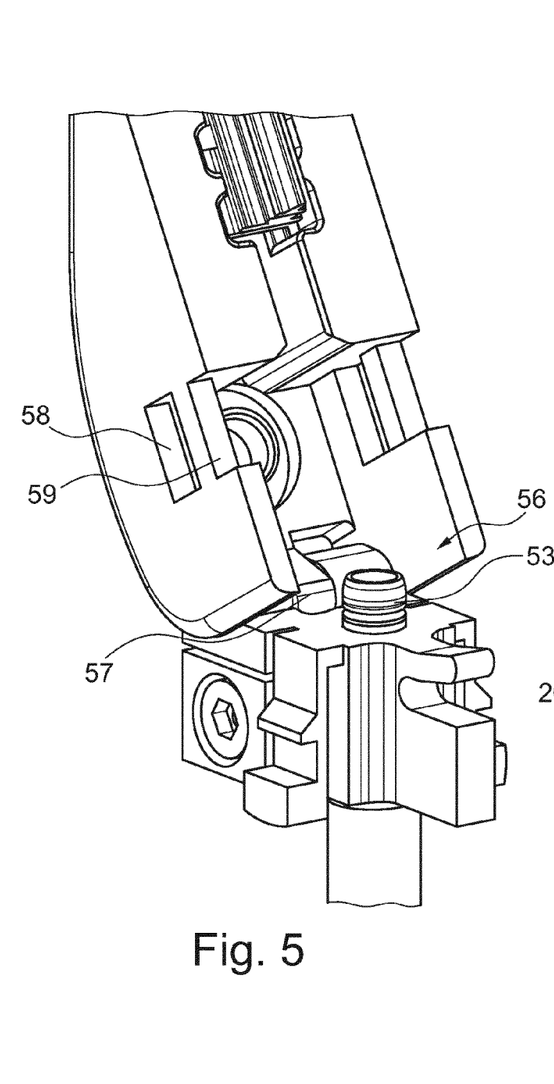

It should also be stated that, in the operating position of the wiper device 100, 100a, the respective clamping screw 28 is arranged such that it is concealed by the wiper arm carrier element 50, 50a. In contrast, the clamping screw 28 is freely accessible from the outside in the service position, which is illustrated in FIGS. 3 to 5, of the wiper arm 10, with the result that the service position is used to fasten the wiper arm 10 on the wiper shaft 11 and to remove said wiper arm from said wiper shaft.

The wiper device 100, 100a described up to this point can be adapted or modified in various ways without departing from the concept of the invention. Therefore, it is feasible, in particular, to construct the mount 51 in the articulation piece 20, 20a, and to provide a connecting-piece-like element, which engages in the mount 51, in the wiper arm carrier element 50, 50a.

LIST OF REFERENCE SYMBOLS

10 Wiper arm
11 Wiper shaft
12 Longitudinal axis
13 Feed tube
15 Toothing region
16 Tooth
17 Upper end face
18 O-ring
20 Articulation piece
20a Articulation piece
21 Receiving bore
22 Receiving section
23 Clamping limb
24 Clamping limb
25 Longitudinal slot
27 Receiving bore
28 Clamping screw
30 Wiper blade
31 Detent tongue
32 Detent hook
33 Operating knob
33a Operating knob
34 Connecting section
35 Central web
36 Slot
37 Spring tongue
38 Planar upper face
39 Retaining region
41 Bore
42 Pivot axis
43 Longitudinal slot
50 Wiper arm carrier element
50a Wiper arm carrier element
51 Mount
52 Outlet connecting piece
53 O-ring
54 Sealing washer
55 Cutout
56 Recess
57 Stop element
58 Cutout
58a Cutout
59 Notch
59a Notch
60 Storage chamber
61 Closure cap
62 Side wall
63 Longitudinal bore
64 Longitudinal bore
68 Washing fluid outlet connecting piece
69 Washing fluid outlet connecting piece
70 Mount
72 Wiper blade carrier element
73 Wiper rubber
74 Wiper lip
75 Covering element
78 Closure cap
79 Nozzle opening
100 Wiper device
100a Wiper device

The invention claimed is:

1. A wiper device for cleaning a vehicle window, comprising
a wiper arm fastened in a torque-proof manner to a wiper shaft via an articulation piece, wherein the wiper arm is arranged pivotably on the articulation piece in a pivot axis;
a wiper blade arranged on the wiper arm; and
a washing device for the wiper blade, which contains a feed for a washing fluid, wherein the feed runs in the longitudinal axis of the wiper shaft and leads to the wiper blade in a direction running substantially perpendicularly to the longitudinal axis, wherein
the feed comprises an outlet connecting piece arranged on the articulation piece or on the wiper arm, oriented parallel to the longitudinal axis of the wiper shaft,
the outlet connecting piece in the operating position of the wiper blade engages in a mount constructed on the wiper arm or on the articulation piece, and
the wiper arm is pivotably arranged in the articulation piece perpendicularly to the longitudinal axis of the wiper shaft at least between two positions, a first position, in which the outlet connecting piece engages into the mount, and a second position, in which the outlet connecting piece is out of engagement with the mount.

2. The wiper device according to claim 1, wherein the mount is constructed together with the washing fluid ducts in a wiper arm carrier element of the wiper arm, and the wiper arm carrier element is constructed at least partially as an injection moulded part.

3. The wiper device according to claim 1, wherein the pivoting angle between the articulation piece and the wiper arm is delimited by stop elements.

4. The wiper device according to claim 1, wherein a sealing element in the form of an O-ring is arranged between the outlet connecting piece and the mount.

5. The wiper device according to claim 1, wherein the region between the articulation element and the wiper arm in the region of the mount is arranged by a sealing element in the form of a sealing washer.

6. The wiper device according to claim 1, wherein the wiper arm is arrested in the first position by means of a detent connection, and that the detent connection has at least one manually actuatable element for clearing the detent connection.

7. The wiper device according to claim 1, wherein the wiper arm is acted upon by force in the direction of the second position by means of a spring element formed in one piece on the wiper arm or on the articulation piece.

8. The wiper device according to claim 1, wherein the wiper arm is fixed on the wiper shaft by a clamping connection having a clamping screw, and that the wiper shaft has a toothing region for fixing the wiper arm in various longitudinal positions of the wiper arm on the wiper shaft.

9. The wiper device according to claim 8, wherein the clamping screw is overlapped by the wiper arm in the first position of the wiper arm, and is freely accessible in the second position.

10. A wiper arm comprising:
a wiper arm carrier element,
wherein the wiper arm is fastened in a torque-proof manner to a wiper shaft via an articulation piece, the wiper arm being arranged pivotably on the articulation piece in a pivot axis,
wherein a wiper blade is arranged on the wiper arm,
wherein a washing device for the wiper blade contains a feed for a washing fluid,
wherein the feed runs in the longitudinal axis of the wiper shaft and leads to the wiper blade in a direction running substantially perpendicularly to the longitudinal axis
wherein the feed comprises an outlet connecting piece arranged on the articulation piece or on the wiper arm, oriented parallel to the longitudinal axis of the wiper shaft,
wherein the outlet connecting piece in the operating position of the wiper blade engages in a mount constructed on the wiper arm or on the articulation piece, and
wherein the wiper arm is pivotably arranged in the articulation piece perpendicularly to the longitudinal axis of the wiper shaft at least between two positions, a first position, in which the outlet connecting piece engages into the mount, and a second position, in which the outlet connecting piece is out of engagement with the mount.

\* \* \* \* \*